(12) United States Patent
Sasaki et al.

(10) Patent No.: US 8,531,539 B2
(45) Date of Patent: Sep. 10, 2013

(54) IMAGE CAPTURING DEVICE, METHOD FOR IMAGE CAPTURING, AND COMPUTER READABLE RECORDING MEDIUM

(75) Inventors: Masaaki Sasaki, Hachioji (JP); Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 836 days.

(21) Appl. No.: 12/372,000

(22) Filed: Feb. 17, 2009

(65) Prior Publication Data

US 2009/0207282 A1 Aug. 20, 2009

(30) Foreign Application Priority Data

Feb. 19, 2008 (JP) .................................. 2008-036995

(51) Int. Cl.
*H04N 5/225* (2006.01)
*H04N 5/262* (2006.01)
*H04N 5/228* (2006.01)

(52) U.S. Cl.
USPC ................. 348/222.1; 348/240.3; 348/208.13

(58) Field of Classification Search
USPC ......... 348/218.1, 239, 208.99, 208.1–208.16, 348/240.3, 222.1; 382/103, 254, 173
See application file for complete search history.

(56) References Cited

U.S. PATENT DOCUMENTS

| 6,215,899 | B1 * | 4/2001 | Morimura et al. ............ 382/154 |
| 6,930,703 | B1 * | 8/2005 | Hubel et al. ..................... 348/37 |
| 7,409,074 | B2 * | 8/2008 | Kondo et al. .................. 382/103 |
| 8,149,290 | B2 * | 4/2012 | Watanabe .................. 348/222.1 |
| 8,194,158 | B2 * | 6/2012 | Watanabe ..................... 348/248 |
| 2002/0036693 | A1 * | 3/2002 | Kinjo ............................. 348/218 |
| 2006/0114331 | A1 * | 6/2006 | Tamamura ............... 348/208.13 |
| 2006/0250505 | A1 * | 11/2006 | Gennetten et al. ......... 348/218.1 |
| 2007/0297694 | A1 | 12/2007 | Kurata |
| 2009/0109304 | A1 * | 4/2009 | Guan ....................... 348/240.99 |
| 2009/0128644 | A1 * | 5/2009 | Camp et al. ................ 348/218.1 |
| 2010/0007759 | A1 * | 1/2010 | Watanabe .................. 348/222.1 |

FOREIGN PATENT DOCUMENTS

| JP | 2002-247439 A | 8/2002 |
| JP | 2003-189171 A | 7/2003 |
| JP | 2007-074031 A | 3/2007 |
| JP | 2008-005084 A | 1/2008 |

OTHER PUBLICATIONS

Japanese Office Action dated Dec. 22, 2009 and English translation thereof issued in a counterpart Japanese Application No. 2008-036995.

* cited by examiner

*Primary Examiner* — Aung S Moe
(74) *Attorney, Agent, or Firm* — Holtz, Holtz, Goodman & Chick, PC

(57) ABSTRACT

A control unit controls an image capture unit to perform a plurality of image captures of an object and acquires a plurality of mutually different image data based on a positional change of an image capturing device. Then, the control unit extracts a specified object image common to each of the acquired plurality of image data. The control unit synthesizes the acquired plurality of image data using the extracted specified object image as a reference, and thereby creates synthesized image data. The synthesized image data is an image equivalent to a captured image having a shallow depth of field such that only the specified object image is clearly photographed and the other portions are blurred.

7 Claims, 5 Drawing Sheets

IMAGE CAPTURING DEVICE, METHOD FOR IMAGE CAPTURING, AND COMPUTER READABLE RECORDING MEDIUM

BACKGROUND OF THE INVENTION

1. Field of the Invention

The present invention relates to an image capturing device, a method for image capturing using the image capturing device, and a computer readable recording medium that records a program for realizing an image capture by the image capturing device.

2. Description of the Related Art

In one photographic technique, a depth of field is made shallow, a focused range is made narrow, and an image is captured in which a background, other than an object image which is in focus, is blurred. To capture a photograph having a shallow depth of field, it is necessary to open the aperture of the camera and extend the focal distance. Generally, in a single lens reflex camera having a large-diameter imaging lens and various possible combinations of apertures and shutter speeds, it is possible to use this technique to capture a photograph.

Conversely, in current popular compact-sized digital cameras and mobile telephones including cameras that have image capture functions, size reductions have led to the use of imaging lenses having small diameters and extremely short focal distances; and therefore, depths of field have become extremely deep. Therefore, in such devices, it is difficult to capture a photograph having bokeh (a photograph in which only the background is blurred to accentuate the main object) by using the technique recited above.

On the other hand, a method is discussed (for example, the reader is directed to Unexamined Japanese Patent Application KOKAI Publication No. 2003-189171) for capturing multiple images having parallax and synthesizing the images to create an image that imitates the same bokeh of a large diameter lens even when using a small diameter imaging lens.

However, in the method of Unexamined Japanese Patent Application KOKAI Publication No. 2003-189171 recited above, an image capture unit having a complex configuration including multiple image capture lenses and image capture elements is necessary for capturing an image having parallax; and unfortunately, implementation in a general compact-sized camera is difficult.

SUMMARY OF THE INVENTION

The present invention is directed to provide an image capturing device, a method for image capturing, and a computer readable recording medium that can acquire an image having a blurred background without using an image capture unit of a complex configuration.

To achieve the objects recited above, an image capturing device according to a first aspect of the present invention comprises: an acquisition unit that performs a plurality of image captures of an object and acquires a plurality of mutually different image data based on a change of a position of the image capturing device; an extraction unit that extracts a specified object image common to each of the plurality of image data acquired by the acquisition unit; and a synthesis unit that obtains synthesized image data by synthesizing the plurality of image data using a specified object image extracted by the extraction unit as a reference.

Also, a method for image capturing according to a second aspect of the present invention comprises: an acquisition step that performs a plurality of image captures of an object and acquires a plurality of mutually different image data based on a change of a position of an image capturing device; an extraction step that extracts a specified object image common to each of the acquired plurality of image data; and a synthesis step that obtains synthesized image data by synthesizing the plurality of image data using an extracted specified object image as a reference.

Further, a computer-readable storage medium according to a third aspect of the present invention stores a program for causing a computer of an image capturing device, comprising an acquisition unit that captures an image of an object and acquires image data, to execute: an acquisition procedure that causes the acquisition unit to perform a plurality of image captures and acquire a plurality of mutually different image data based on a change of a position of the image capturing device; an extraction procedure that extracts a specified object image common to each of the acquired plurality of image data; and a synthesis procedure that obtains synthesized image data by synthesizing the plurality of image data using an extracted specified object image as a reference.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Hereinafter, embodiments of the present invention are described in detail with reference to the drawings.

(Embodiment 1)

Figure 1:
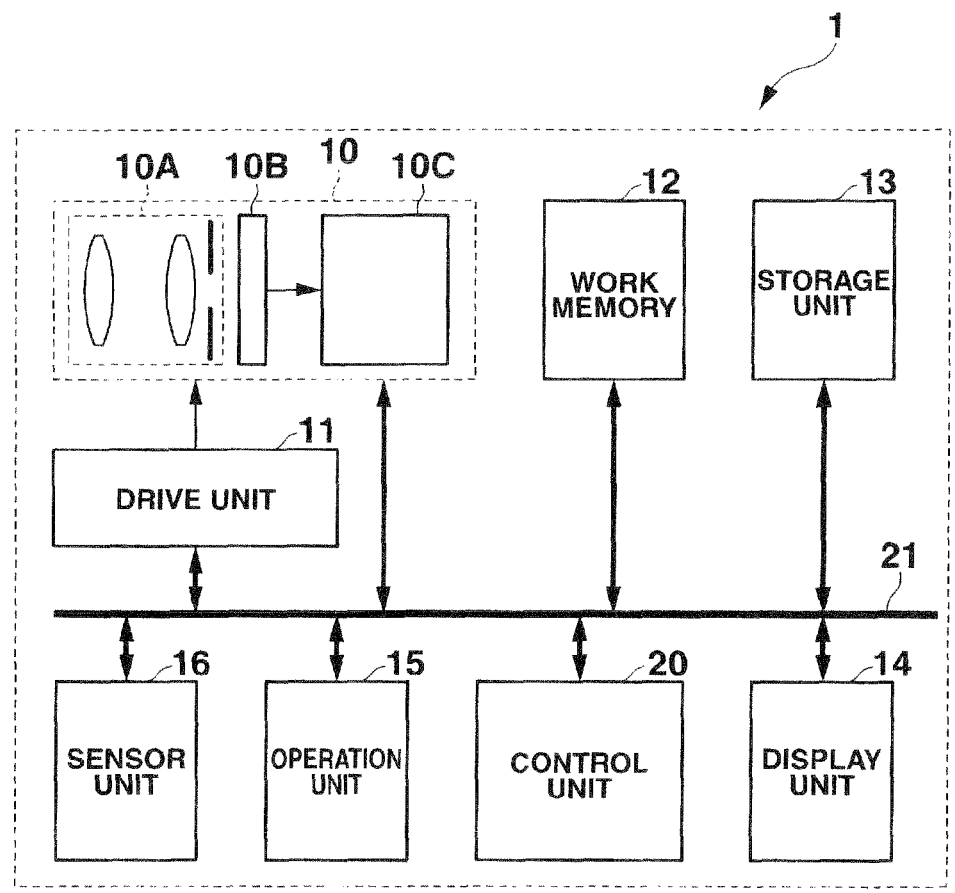
FIG. 1 is a block diagram illustrating a configuration of an image capturing device according to embodiments 1 and 2 of the present invention.

FIG. 1 illustrates a function block diagram of a digital still camera (hereinafter referred to as "digital camera") 1 as an image capturing device according to this embodiment. As illustrated in FIG. 1, the digital camera 1 includes an image capture unit 10, a drive unit 11, a work memory 12, a storage unit 13, a display unit 14, an operation unit 15, a sensor unit 16 as a detection unit, a control unit 20, and an internal bus 21. The image capture unit 10, the drive unit 11 the work memory 12, the storage unit 13, the display unit 14, the operation unit 15, the sensor unit 16, and the control unit 20 are connected to each other via the internal bus 21.

The image capture unit 10 captures an image of an object and, as a result, outputs the obtained image data. The image capture unit 10 includes an optical system 10A, an image capture element 10B, and a signal processing unit 10C.

The optical system 10A includes a lens group, an aperture mechanism, and the like. Light from the object enters via the optical system 10A. The image capture element 10B is an image sensor provided rearward along an optical axis of the optical system 10A. Luminous flux enters via the lens group (focus lens and zoom lens) of the optical system 10A and reaches a light reception surface (image capture surface) of the image capture element 10B via the aperture mechanism. For the image capture element 10B, for example, a CCD (charge-coupled device) or CMOS (complementary metal oxide semiconductor) sensor may be used. The image capture element 10B receives the light entering via the optical system 10A on multiple pixels formed on the light reception surface and outputs an electrical signal according to the intensity of the light received by each of the pixels.

The lens group and the aperture mechanism of the optical system 10A are driven by the drive unit 11. In other words, the drive unit 11 can adjust the position of the lens group in the optical axis direction and can adjust the aperture size (stop size) of the aperture mechanism. A zoom function is realized and an autofocus and an automatic exposure adjustment are realized by the driving of the drive unit 11. The aperture mechanism may also serve as a shutter mechanism of the digital camera 1.

The signal processing unit 10C converts the electrical signal, which is output by the image capture element 10B, into image data. In the signal processing unit 10C, the input electrical signal undergoes various processing such as color separation, gain control, white balance, and the like; and the processed electrical signal undergoes A/D conversion and is converted into a luminance signal and a color difference signal. The image data created by these conversions is stored in the work memory 12 via the internal bus 21.

The work memory 12 is a memory that temporarily stores the image data sent by the image capture unit 10. The work memory 12 has a capacity to simultaneously store at least N (N is a natural number) frames of image data. For the work memory 12, for example, DRAM (Dynamic Random Access Memory) may be used.

The storage unit 13 stores the final image data acquired by the digital camera 1 in a predetermined file format. Such a storage unit 13 may include, for example, a removable recording medium and the like.

The display unit 14 is a display device including, for example, a color liquid crystal display device and the like. The display unit 14 displays an image based on the image data obtained via the image capture unit 10 (a so-called through-the-lens image), images based on the image data acquired by image captures, various setting information of the digital camera 1, guidance information of various operations, etc. The display unit 14 may also be a touch panel.

The operation unit 15 has various operation buttons provided on an external face of a housing, etc., of the digital camera 1. Upon an operation of the operation buttons by a user, the operation unit 15 outputs a signal according to the operation to the control unit 20 via the internal bus 21. Such operation buttons include, for example, a shutter button. The shutter button can accommodate a two stage pressing by the user, namely, a half press and a full press. Upon a half press of the shutter button, the operation unit 15 outputs a focus instruction signal, and the digital camera 1 performs the autofocus and the automatic exposure adjustment. Also, upon a full press of the shutter button, the operation unit 15 outputs an image capture instruction signal; and an image capture is performed by the image capture unit 10.

The sensor unit 16 includes an acceleration sensor, a gyro sensor (angular velocity sensor), and the like, which are not illustrated. The acceleration sensor detects an acceleration occurring due to a positional change of the digital camera 1; and the gyro sensor detects an angular velocity occurring due to an attitudinal change of the digital camera 1. Detection signals of the various sensors (namely, information relating to the detected acceleration and angular velocity) is output to the control unit 20 via the internal bus 21.

The control unit 20 includes a CPU (Central Processing Unit), ROM (Read Only Memory), RAM (Random Access Memory), etc., which are not illustrated. The control unit 20 has various programs and various data for performing consolidated control of the operations of the entire digital camera 1. The control unit 20 executes the programs and controls the image capture unit 10, the drive unit 11, and the like based on operation signals and the like that are input from the operation unit 15 (including detection signals from the touch panel in the case where the display unit 14 is a touch panel) and based on detection signals that are input from the sensor unit 16.

Next, operations of the digital camera 1 according to this embodiment are described. First, an operation of the digital camera 1 when performing a normal image capture is described. For a normal image capture, upon one full press of the shutter key of the operation unit 15 and under the control of the control unit 20, one frame of image data is acquired as a result of an image capture by the image capture unit 10 and is stored in the storage unit 13.

The digital camera 1 according to this embodiment, in addition to such normal image capturing, can perform an image capture that clearly photographs only a specified object image while blurring the other portions as background. Thus, the processing executed when capturing a blurred background image is hereinafter referred to as "background-blurred image capture processing." A switch between the normal image capture processing that performs a normal image capture and the background-blurred image capture processing is possible by a button operation of the operation unit 15. By executing the background-blurred image capture processing, an image can be obtained similar to, for example, a photograph taken using a single lens reflex camera or the like having a shallow depth of field. Hereinafter, the background-blurred image capture processing is described.

Figure 2:
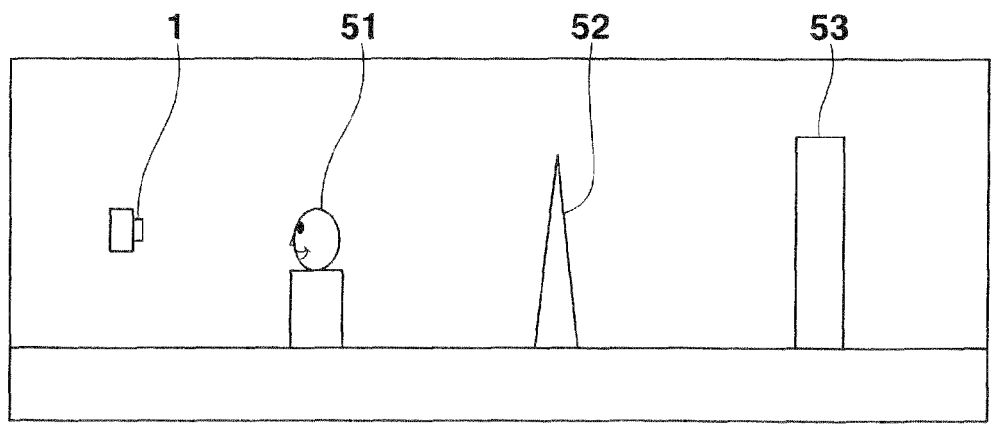
FIG. 2 illustrates an example of an object of an image capture for which a background-blurred image capture processing is performed.

The background-blurred image capture processing is performed, for example, in the case where the user performs an image capture with the digital camera 1 in a state of being hand-held, i.e. a hand-held image capture. Also, in the case where such an image capture is performed, rather than a planar object such as a picture affixed to a wall or a large screen, the object of the image capture generally has depth, wherein a main object exists on a front side of the digital camera 1 and a background spreads therebeyond. Hereinafter, the background-blurred image capture processing is described, when appropriate, by an example as illustrated in FIG. 2 wherein a scene having objects 51, 52, and 53 arranged in order from the digital camera 1 is captured. The object 51 nearest the digital camera 1 is a human. To simplify the descriptions for FIG. 5 to FIG. 9 described hereinafter, the reference numerals 51 to 53 also are used for the images of the objects 51 to 53 in the image data obtained as a result of image captures.

Figure 3:
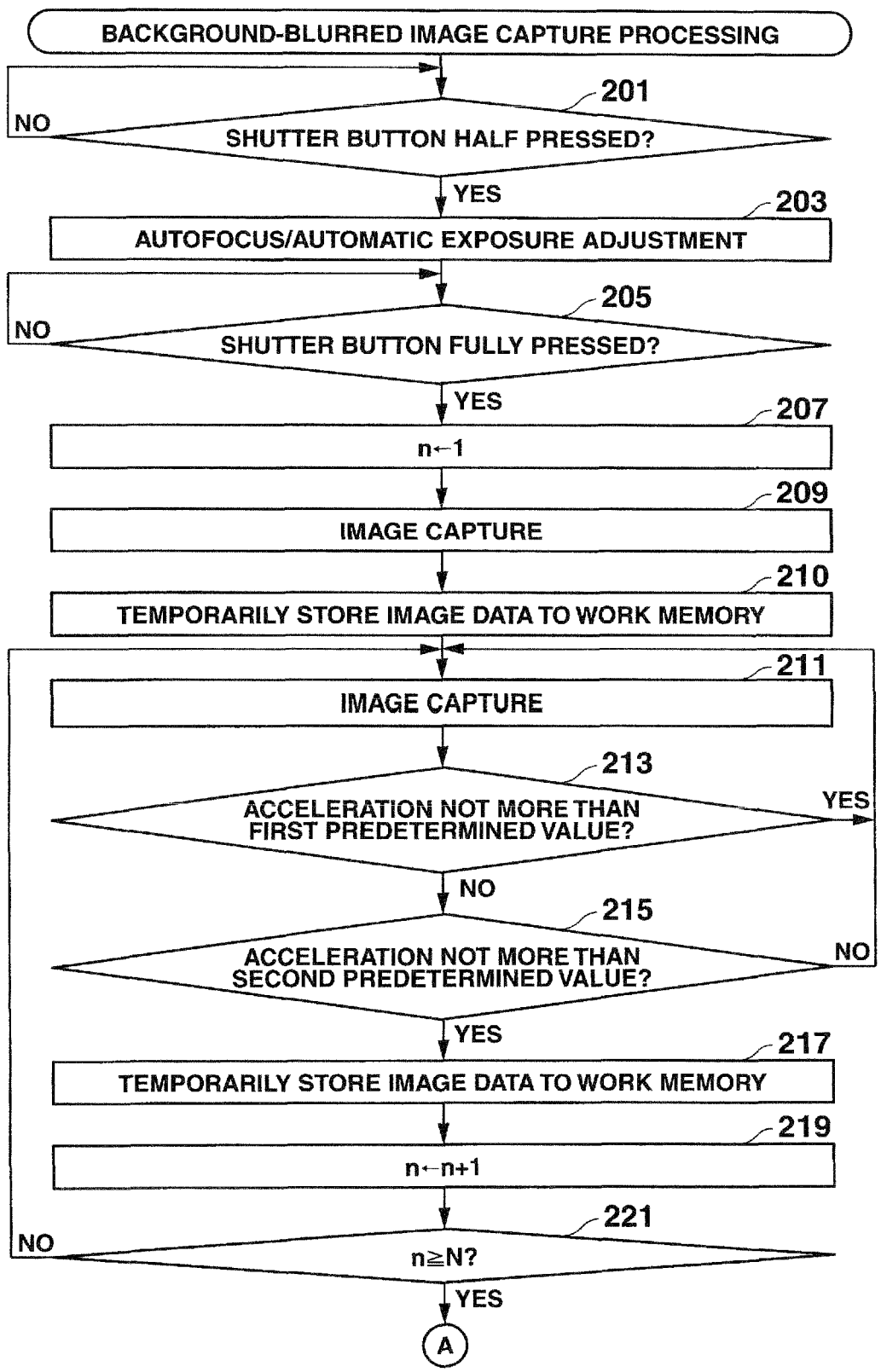
FIG. 3 is a flowchart (part one) of a background-blurred image capture processing by a control unit.
Figure 4:
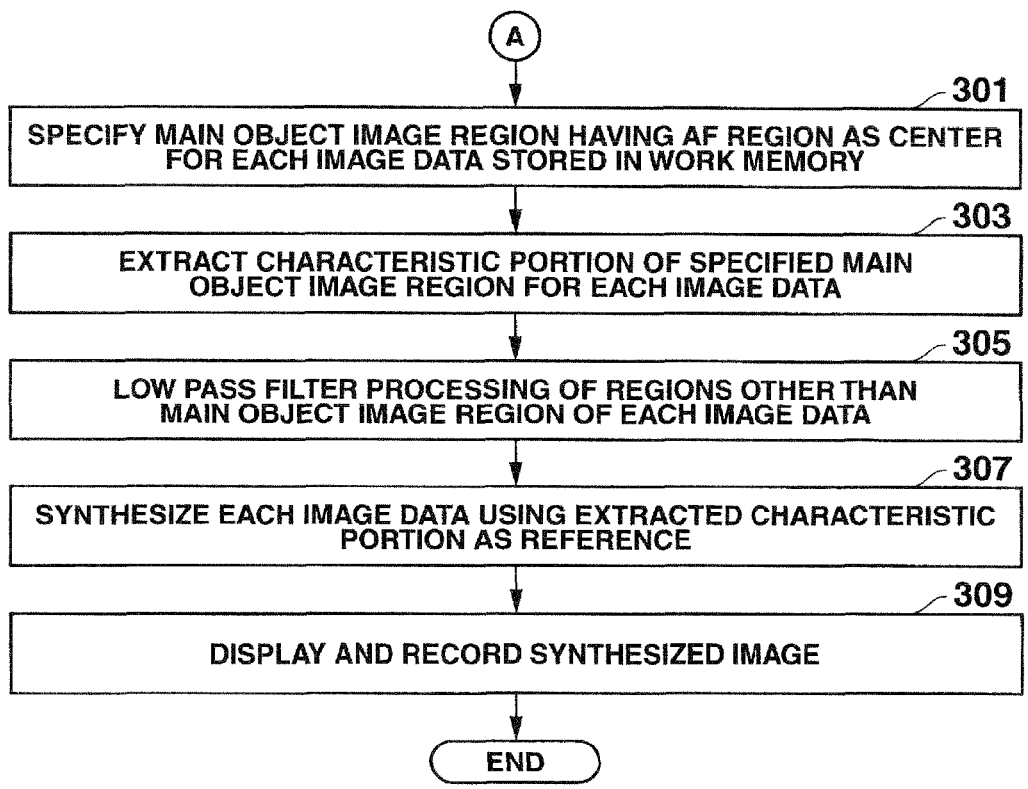
FIG. 4 is a flowchart (part two) of the background-blurred image capture processing by the control unit.

FIG. 3 and FIG. 4 illustrate a flowchart of a background-blurred image capture processing performed by the control unit 20. First, in step 201, the control unit 20 waits until the shutter button of the operation unit 15 is half pressed. Upon a half press of the shutter button of the operation unit 15, a focus instruction signal from the operation unit 15 is sent to the control unit 20 via the internal bus 21. The control unit 20 repeats step 201 until the focus instruction signal is input.

In the case where the shutter button is half pressed and the focus instruction signal is input, the determination of step 201 is affirmative, and the control unit 20 proceeds to step 203. In step 203, the control unit 20 directs the drive unit 11 to perform an autofocus and an automatic exposure adjustment.

The autofocus (AF) is performed by a contrast detection method. The contrast detection method is a method that defines the focal position as the lens position having the maximum contrast components (high frequency components) of a predetermined region in the imaging field of view (a region in a so-called AF frame, also called the AF area).

More specifically, the control unit 20 moves the focus lens of the optical system 10A by the drive unit 11 in the optical axis direction. Then, the control unit 20 causes the image capture unit 10 to acquire image data at each lens position by image captures by the image capture element 10B while the focus lens is moved. Then, the control unit 20 calculates an evaluation value indicating the magnitude of the contrast components (high frequency components) of the region in the AF frame for each image data. Further, the control unit 20 moves the focus lens of the optical system 10A to a lens position of the greatest evaluation value by a drive of the drive unit 11. Thus, a state is reached where the object in the AF frame is in focus.

Additionally, the automatic exposure adjustment is performed, for example, by controlling the aperture mechanism by the drive unit 11 to maximize the variance of the luminance of the object image optically formed on the image capture element 10B.

The AF frame used for the autofocus normally is set in a central vicinity of the imaging field of view, but the position of the AF frame may be modifiable by an operation of the user to the left or right, upward, or downward. Furthermore, in the case where the display unit 14 is, for example, a touch panel, the user may set any region in the imaging field of view as the AF frame by an operation of the touch panel, etc.

Also, a region having the maximum contrast in the imaging field of view may be automatically detected; and further, the autofocus may be performed with the detected region set as the AF frame. Additionally, a human face may be detected in the imaging field of view by a correlation calculation using a template image of a human face; and the position of the AF frame may be automatically adjusted to the position of the human face.

Figure 5:
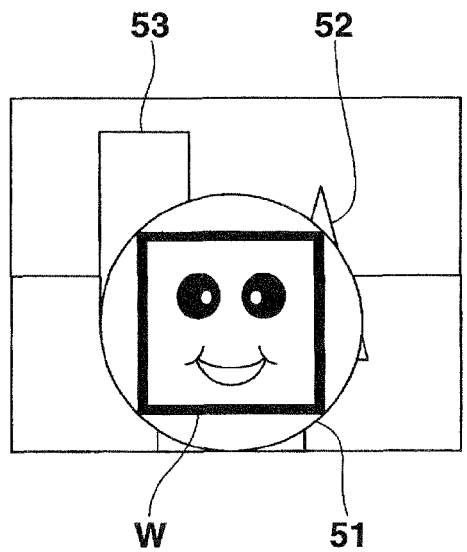
FIG. 5 illustrates an example of a focused object image.

FIG. 5 is an example of the case where an AF frame W is set to the frontward object 51 by an autofocus and an operation of the user for the object of an image capture illustrated in FIG. 2. The control unit 20 retains the positional information of the AF frame in the imaging field of view determined as described above in internal RAM.

Returning to FIG. 3, in the next step 205, the control unit 20 waits until the shutter button of the operation unit 15 is fully pressed. Upon a full press of the shutter button of the operation unit 15, an image capture instruction signal from the operation unit 15 is sent to the control unit 20 via the internal bus 21. The control unit 20 repeats step 205 until the image capture instruction signal is input.

In the case where the shutter button is fully pressed and the image capture instruction signal is input, the control unit 20 proceeds to step 207. In step 207, the control unit 20 initializes an internal variable n to the value of one. The internal variable n is a variable indicating the acquired frames of the currently acquired image data for the background-blurred image capture processing and is retained in RAM of the control unit 20.

In the next step 209, the control unit 20 causes the image capture unit 10 to perform a first image capture. By the image capture, one frame of image data is acquired by the image capture unit 10. The image data acquired at this time is a reference image. In the next step 210, the control unit 20 stores temporarily the image data to the work memory 12 via the internal bus 21.

In the next step 211, the control unit 20 causes the image capture unit 10 to perform a second image capture. Thus, in the background-blurred image capture processing according to this embodiment, a so-called continuous image capture is performed in which a single press of the shutter button performs multiple image captures.

In the next step 213, the control unit 20 detects whether or not an acceleration of the digital camera 1 is not more than a first predetermined value based on a detection signal from the acceleration sensor of the sensor unit 16. The control unit 20 returns to step 211 in the case where the determination is affirmative, and proceeds to step 215 in the case where the determination is negative.

In other words, in the case where the acceleration during the second image capture is small, it may be inferred that the capture position during the second image capture, namely, the position at which the user holds the digital camera 1 during the second image capture, has changed almost none from the position (image capture position) at which the user held the digital camera 1 during the first image capture.

In particular, in the case where the acceleration is zero, it may be inferred that the digital camera 1 is stationary during the first image capture and the second image capture.

In this case, the image obtained by the second image capture is an image having no change of relative position of the object image in comparison to that of the reference image (first image frame). Therefore, even when the reference image and the image obtained by the second image capture are synthesized, the backgrounds completely overlap, and an image having a blurred background cannot be obtained.

In this embodiment, the first predetermined value is set to zero or to a value near zero. Accordingly, in the case where the acceleration is, for example, zero, the determination of step 213 is affirmative; and the control unit 20 returns to step 211 and again causes the image capture unit 10 to perform an image capture.

Thus, as long as the acceleration of the digital camera 1 is not more than the first predetermined value, the determination of step 213 remains affirmative, and the image capture of step 211 and the determination of step 213 are repeated. However, in this embodiment, the user hand-holds the digital camera 1; and therefore it is considered that the case where the acceleration is zero is very rare.

In the case where the acceleration during the image capture is more than the first predetermined value and the determination of step 213 is negative, the control unit 20 proceeds to step 215. In step 215, the control unit 20 determines whether or not the acceleration of the digital camera 1 is not more than a second predetermined value. The second predetermined value is set to a value greater than the first predetermined value. The control unit 20 returns to step 211 in the case where the determination is negative, and proceeds to step 217 in the case where the determination is affirmative. An acceleration during the image capture that exceeds the second predetermined value indicates that the image capture position of the digital camera 1 has drastically changed in comparison to that of the previous image capture. When the image capture position drastically changes, the scene in the imaging field of view also drastically changes; and there is a high possibility that suitable image data cannot be obtained for synthesizing with other image data to create an image having a blurred background. Therefore, at this point, it is determined whether or not the acceleration during the image capture is not more than the second predetermined value; and in the case where the acceleration is too large, the image data is not used for synthesis.

Thus, the control unit 20 proceeds to step 217 only in the case where the acceleration during the image capture is larger than the first predetermined value and not more than the second predetermined value. In step 217, the control unit 20 stores the image data obtained by the image capture of the image capture unit 10 to the work memory 12 via the internal bus 21. In the next step 219, the control unit 20 increments the value of the internal variable n by a value of one. In the next step 221, the control unit 20 determines whether or not the value of the internal variable n has reached N. In the case where the determination at this point is negative, the control unit 20 returns to step 211.

Thereafter, steps 211 to 221 are repeated until the value of the internal variable n reaches N. Thus, in the case where the acceleration during the image capture is larger than the first predetermined value and not more than the second predetermined value, N frames of captured image data are acquired and stored to the work memory 12.

Figure 6A:
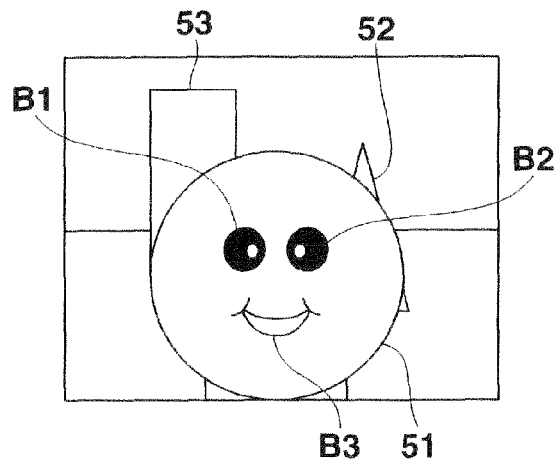
FIG. 6A to FIG. 6C illustrate examples of acquired image data.
Figure 6B:
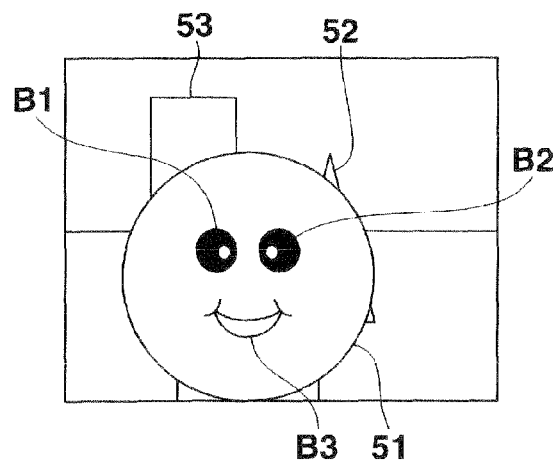
Figure 6C:
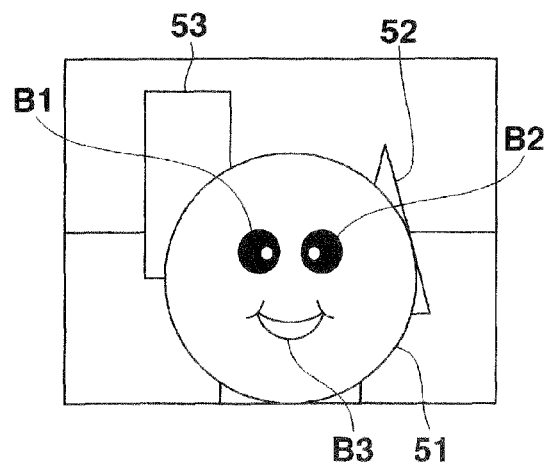

For example, the case is considered where image captures of step 209 and step 211 are performed to obtain the image of FIG. 6A as a reference image (a first image frame obtained by a first image capture), an image such as that of FIG. 6B as a second image frame (an image obtained by a second image capture), and an image such as that of FIG. 6C as a third image frame (an image obtained by a third image capture).

The second image frame is an image in the case where the position, at which the user holds the digital camera 1 (image capture position), moves to the right from the time of the first image capture along a planar face orthogonal to the optical axis of the lens group of the optical system 10A.

The third image frame is an image in the case where the position, at which the user holds the digital camera 1 (image capture position), moves to the left from the time of the first image capture along the planar face. As illustrated in FIG. 6A to FIG. 6C, as the image capture positions change during each image capture, the relative positional relationship of the images of the objects 51, 52, and 53 in the imaging field of view change; and a different image is obtained for each.

The relative positional relationship of the images of the objects 51, 52, and 53 in the imaging field of view change according to the distance between the digital camera 1 and each of the objects 51, 52, and 53. As the image capture position of the digital camera 1 changes to the left and right, the position of the image in the imaging field of view of the object 51 near the digital camera 1 changes greatly. On the other hand, even as the image capture position of the digital camera 1 changes to the left and right, the change of the positions of the images in the imaging field of view of objects 52 and 53 distant from the digital camera 1 are relatively small.

Returning to FIG. 3, in the case where the value of the internal variable n reaches N and the determination of step 221 is affirmative, the control unit 20 proceeds to step 301 of FIG. 4. In step 301, the control unit 20 specifies a main object image region, having the AF region W (refer to FIG. 5) used for the autofocus as a center, for each image data recorded in the work memory 12. Here, the main object image region refers to a region including an object image having a characteristic portion that serves as a reference of the matched overlay of the image data described below for the background-blurred image capture processing.

In the digital camera 1 according to this embodiment, a contrast detection method is used as the autofocus method; and therefore, the region in focus in the captured image can be assumed to be a portion of high contrast in the image. Therefore, at this point, the region having a high contrast in the image data is specified as the main object image region.

The portion having high contrast is a portion in which changes in the luminance value between adjacent pixels are large; and it may be inferred that it is a portion including high spatial frequency components in the field of the image data. The region including high spatial frequency components can be detected by comparing luminance values of mutually proximal pixels. For example, the control unit 20 sets a region (hereinafter referred to as "region F") having a suitable size in the image data and having the position of the AF region set in step 203 (refer to FIG. 3) as a center, and calculates a mean value of the luminance values of each pixel in the region F. Then, the control unit 20 calculates a sum of absolute differences or a sum of squared differences between the luminance values of each pixel in the region F and the mean value thereof.

Further, the control unit 20 changes the size or position of the region in the image data having the AF region W as the center and performs the calculation described above each time. Then, the control unit 20 specifies the region having the maximum calculated value (namely, the sum of absolute differences or the sum of squared differences of the luminance values of each pixel in the region F) as the main object image region.

Figure 7:
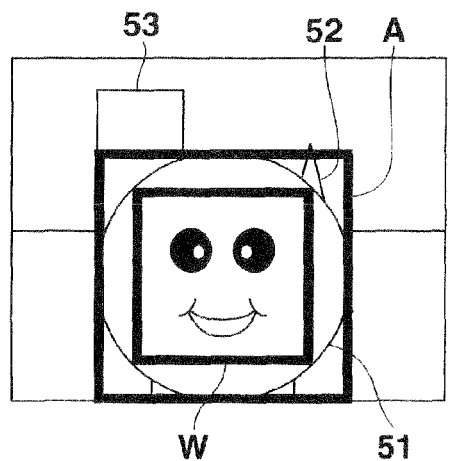
FIG. 7 illustrates an example of a main object image region.

For example, in FIG. 7, a region A (namely, the region of the image of the object 51) is specified as the main object image region.

By such processing, for each image data illustrated in FIG. 6A to FIG. 6C, a region including the image of the object 51 is specified, for example, as the main object image region. The control unit 20 may also use the unaltered AF region W set by the autofocus of step 203 recited above as the main object image region.

Figure 8:
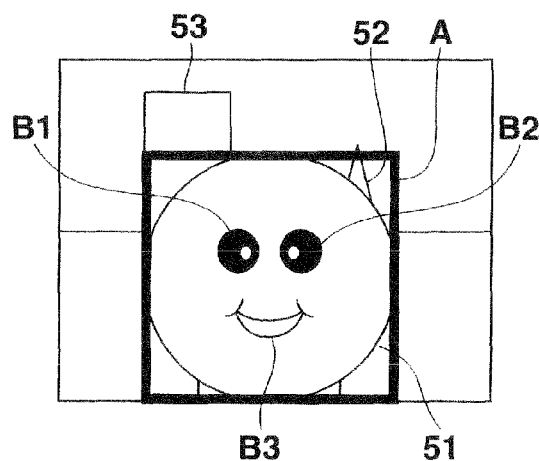
FIG. 8 illustrates an example of a characteristic portion of the main object image region.

Returning to FIG. 4, in the next step 303, the control unit 20 extracts a characteristic portion of the specified main object image region for each image data and retains the position in the image data in RAM. Here, the characteristic portion is a specified portion that is distinguishable from other portions in the main object image region. For example, a portion having large changes in color or changes in luminance in comparison to the surroundings may be a characteristic portion. As illustrated in FIG. 8, in the case where the main object is the face of a human, eye portions B1 and B2 and a mouth portion B3 of the human can be extracted as characteristic portions.

The extraction of such characteristic portions is performed on the first image frame (reference image). First, portions having particularly large changes in luminance are extracted from the main object image region of the reference image specified in step 301 recited above. For example, for the image of the object 51 of FIG. 8, the eye portions B1 and B2 and the mouth portion B3, which have large changes in luminance from a skin portion, are extracted.

In this embodiment, the control unit 20 extracts images of the eye portions B1 and B2 and the mouth portion B3 from the reference image as template images. Then, the control unit 20 scans the template images over the main object image region of the image data acquired by the second and subsequent image captures and performs a correlation calculation between the image data and the template images. As a result, the control unit 20 extracts the portions having the highest correlation (correspondence) as the positions of the corresponding characteristic portions of the image data.

By the above processing, a tracking of the characteristic portions is performed for the image data of the second and subsequent frames; and the positions of the characteristic portions in each image data are clarified. The positions of the characteristic portions of the N frames of image data are retained in RAM of the control unit 20.

In the case where the main object is a face of a human, a characteristic portion is not limited to an eye, nose, or mouth thereof; and moles, etc., on the face also become characteristic portions. Also, in the case where the main object is a flower, edges of petals, etc., thereof become characteristic portions.

Returning to FIG. 4, in the next step 305, the control unit 20 performs a low pass filter processing on regions other than the main object image regions of each image data. Thus, the spatial frequency components not more than a cutoff frequency of the regions other than the main object image regions are reduced, and it is possible to further blur the images of objects other than the main object.

In next step 307, the control unit 20 synthesizes each image data using the extracted characteristic portions as references, namely, in a state in which the positions of each characteristic portion are matched; and creates synthesized image data. More specifically, the control unit 20 adjusts the position, rotation, and scale among the image data such that the characteristic portions of each image data completely overlap, and performs a synthesis of the N frames of image data in a state of matched positions of characteristic portions. In this case, the luminance value of each pixel of the synthesized image may be a mean value of the luminance values of each corresponding pixel of each image data. Or, the control unit 20 may perform a so-called medium filter processing to obtain the luminance value of each pixel of the synthesized image. Also, in the case where the positions of each pixel of the image data, which are matched and overlaid by the rotations and the like of the image data, do not match, the control unit 20 may perform an interpolation of the luminance values of each pixel and perform the matched overlay by the luminance values calculated by the interpolation.

Figure 9:
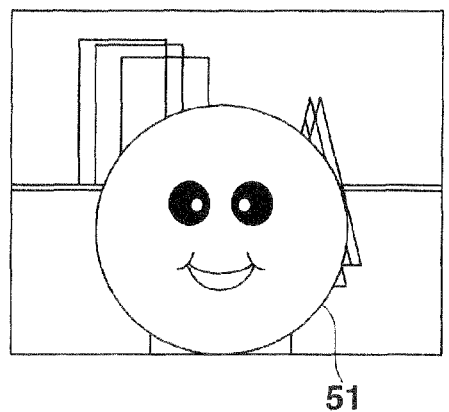
FIG. 9 illustrates an example of a synthesized image.

For example, in the case where image data such as those of FIG. 6A, FIG. 6B, and FIG. 6C are obtained and the eye portions B1 and B2 and the mouth portion B3 are extracted as characteristic portions, the image data are matched and overlaid with the eye portions B1 and B2 and the mouth portion B3 in a matched state. Thus, a synthesized image such as that illustrated in FIG. 9 is obtained. As illustrated in FIG. 9, a matched overlay is performed for the images in which the eye portions B1 and B2 and the mouth portion B3, which are the characteristic portions of the image of the object 51, are in a matched state; and therefore, the images of the object 51 are synthesized in a completely matched state. On the other hand, the images of the other objects 52 and 53 are matched and overlaid in a shifted state. As a result, the image of the object 51 remains clearly photographed, and the images of the other objects 52 and 53 are in a doubly or triply shifted state.

Normally, there is no regularity in the movement direction of the hand of the user holding the digital camera 1; and the digital camera 1 moves randomly upward, downward, and to the left and right at short intervals. Accordingly, even for continuous image captures over short periods of time, the image capture positions thereof differ randomly. Accordingly, as images are synthesized, the images of the objects 52 and 53 other than the object 51 are randomly shifted and synthesized, and the image thereof is averaged and blurred. As a result of the synthesis, the synthesized image is an image equivalent to a captured image having a shallow depth of field such that only the object 51 is in focus, and the other portions are blurred as background.

Returning to FIG. 4, in the next step 309, the control unit 20 causes the display unit 14 to display the created synthesized image data on and simultaneously stores the same to the storage unit 13. After executing step 309, the control unit 20 ends the background-blurred image capture processing.

As is clear from the descriptions heretofore, the processing of steps 201 to 221 of the control unit 20 corresponds to an acquisition unit, an acquisition step, and an acquisition procedure; the processing of steps 301 and 303 corresponds to an extraction unit, an extraction step, and an extraction procedure; and the processing of step 307 corresponds to a synthesis unit, a synthesis step, and a synthesis procedure. Also, the processing of steps 213 and 215 corresponds to a determination unit; and the processing of step 305 corresponds to a filter processing unit.

By executing the processing of steps 201 to 221 as described in detail above, for each image capture of the digital camera 1 according to this embodiment, N frames of image data are acquired, each having a different position at which the user held the digital camera 1 (image capture position).

In other words, N frames of image data are acquired, each having different distances between the positions of each of the objects 51, 52, and 53 and the position of the digital camera 1.

Then, the processing of steps 301 to 307 is executed to synthesize the acquired N frames of image data using the characteristic portions of the specified object image as references. A difference, namely, parallax, occurs in the visual images of objects and directions due to differences in the image capture positions among the image data, each having different image capture positions.

Accordingly, by matching and overlaying the image data using the characteristic portions of the specified object image in the image data as references, the object images in the other portions are synthesized in a positionally shifted state; and an image resembling an out of focus state is formed.

In other words, in the synthesized image, the specified object image is clearly photographed, and the other portions are a blurred image.

As a result, even for an imaging lens having a small diameter, an image having a blurred background can be obtained without including an image capture unit having a complicated configuration.

Also, this embodiment includes a sensor unit 16 having an acceleration sensor; and the control unit 20 determines whether or not the image capture position has changed based on the acceleration from the acceleration sensor of the sensor unit 16. Then, the control unit 20 acquires the image capture results (in other words, the image data) when determining that the image capture position has changed.

Thus, it is possible to reliably acquire N frames of image data, each having different image capture positions.

Also, in this embodiment, image data that is captured when the acceleration detected by the acceleration sensor of the sensor unit 16 exceeds a predetermined level (the second predetermined value) is not acquired. Thus, the use of image data having completely different scenes in the imaging field of view for image synthesis can be avoided; and therefore, good synthesized image data can be acquired.

In this embodiment, the sensor used for the background-blurred image capture processing is an acceleration sensor; but other sensors such as, for example, a gyro sensor and the like may be used to detect differences in image capture positions. It is also possible to use other sensors such as positional sensors and velocity sensors if the sensor can detect differences in image capture positions.

(Embodiment 2)

The embodiment 1 recited above addresses the case where the image capture position changes mainly along a planar face orthogonal to the optical axis of the lens group of the optical system 10A. In this embodiment, a background-blurred image capture processing can also be performed for images continuously captured while shifting the digital camera 1 mainly in a frontward and rearward direction (the optical axis direction of the lens group of the optical system 10A. In other words, this embodiment addresses background-blurred image capture processing for the case where the image capture position changes mainly in the optical axis direction of the imaging lens.

In this case, the enlargement ratio or the reduction ratio of the size of the images of the objects in the imaging field of view change according to the distances between the digital camera 1 and each object. As the image capture position of the digital camera 1 changes to the front in the optical axis direction, in other words, as the position of the digital camera 1 nears the positions of the objects, objects nearer to the digital camera 1 have larger images in the imaging field of view. On the other hand, objects distant from the digital camera 1 exhibit relatively small changes in image size in the imaging field of view even when the distance between the object and the digital camera 1 changes.

Therefore, in this embodiment, the control unit 20 matches the size of the main object image regions of multiple captured image data by enlarging or reducing such that the size of the main object image regions match, and synthesizes multiple continuously captured image data. Processing other than the enlargement or reduction of image data for matching the size of the main object image regions is similar to that of the embodiment 1 recited above in which the image capture position changes in a direction orthogonal to the optical axis of the imaging lens (left and right).

The multiple image data used to create the synthesized image data can be obtained by continuously capturing images while driving a zoom lens in the optical axis direction. In other words, the control unit 20 drives the zoom lens by the drive unit 11 and changes the position of the zoom lens once each time the image capture unit 10 is caused to perform an image capture. Then, after one drive of the zoom lens is completed, the image capture unit 10 is caused to perform the next image capture. By repeating the above, multiple image data can be obtained to use for creating the synthesized image data. In the case where the zoom lens can be driven at a constant speed in the optical axis direction, it is not necessary to perform the image capture by determining whether or not the image capture position has changed based on an acceleration from an acceleration sensor.

On the other hand, the digital camera 1 moves randomly due to being hand-held by the user, and of course the digital camera 1 may move in the frontward and rearward direction. In other words, multiple image data in which the image capture position changes in the optical axis direction of the lens group of the optical system 10A may be obtained by unsteadiness of the hand.

For example, the case is considered where three image frames are obtained by the image captures of step 209 and step 211 recited above; that is, the first image frame obtained by the first image capture, the second image frame obtained by the second image capture, and the third image frame obtained by the third image capture.

Here, the case is considered where the second image frame is an image in which the image capture position has moved frontward in the optical axis direction of the lens group of the optical system 10A from the time of the first image capture; and the third image frame is an image in which the image capture position has moved rearward in the optical axis direction from the time of the first image capture.

Even in this case, as the image capture position changes for each image capture, the distances change between the positions of each of the multiple objects in the imaging field of view and the position of the digital camera 1; and therefore, the relative positional relationship in the images of the multiple object images changes among the first to third image frames; and the first to third image frames are mutually different images.

Normally in this case, the image capture position changes also along the planar face orthogonal to the optical axis. Therefore, it is necessary for the control unit 20 not only to enlarge or reduce the image data for matching the size of the main object image regions, but also adjust the position and rotation among the image data such that the characteristic portions of each image data completely overlap, and to perform synthesis of the image data in which the positions of the characteristic portions are in a matched state.

Also in this embodiment, similar to the embodiment 1 recited above, a low pass filter processing is performed on the regions other than the main object image region of each image data. Thus, the high spatial frequency components included in the regions processed as background can be reliably reduced. As a result, even if the number of the synthesized image data is small, the background can be sufficiently blurred; and therefore, it is possible to reduce the number of frames of acquired image data.

Various modes are conceivable for implementing the present invention and are of course not limited to the embodiments 1 and 2 recited above.

For example, in each of the embodiments recited above, a portion having large changes in color or changes in luminance in comparison to the surroundings is extracted as a characteristic portion; but simply the entire main object image region may be used as the characteristic portion. In this case, as in the example illustrated in FIG. 8, the entire image of the object 51, namely, the entire face of the human becomes the characteristic portion.

Also, in the case where the entire face is used as the characteristic portion, a characteristic portion may be extracted by using a template image of a face. For example, a template image of a typical human face may be stored in advance in the storage unit 13 or the like; and a portion of each image data having a high correspondence to the template image may be extracted as a characteristic portion.

Also, simply the portion that is most in focus may be extracted as a characteristic portion. Alternatively, multiple frames of image data may be compared, and the portion having the most or the least amount of movement in the main object image region may be extracted as a characteristic portion.

Also, in each of the embodiments recited above, a region having the AF region W of the autofocus as the center and having a large sum of absolute differences or sum of squared differences between the luminance value of each pixel in the image data and the mean value thereof is specified as the main object image region; but the method for specifying the main object image region is not limited thereto. For example, the sum of absolute differences or the sum of squared differences from the luminance value of a specified pixel (for example, the pixel of the upper left corner) may be used to specify the main object image region. Alternatively, a variance value or a standard deviation value may be used; or simply a region having a large difference between the highest luminance value and the lowest luminance value in the region may be specified as the main object image region. Or, a two-dimensional Fourier transform may be performed on the image; and a region including high spatial frequency components may be extracted as the main object image region.

Also, in each of the embodiments recited above, an image of an object in focus by the autofocus is specified as the image of the specified object; but the display unit 14 may be a touch panel, the reference image may be displayed on the display unit 14, and the user may use the touch panel, etc., to select the image of the specified object. In other words, a main object image may be specified from an object image included in the image data based on operation input information by the user; and a characteristic portion of the specified main object image may be extracted.

Moreover, generally, the main object is often the object nearest the digital camera 1; and therefore, the image of the object nearest the digital camera 1 may be detected; and the image of the object may be specified as the main object image. Generally, in the case where the digital camera 1 translates relative to the image capture surface, the image of an object nearer to the digital camera 1 has a larger amount of movement in the imaging field of view. Conversely, in the case where the digital camera 1 rotates in a panning direction (rotating around a vertical axis), the image of an object nearer to the digital camera 1 has a correspondingly smaller amount of movement in the imaging field of view; and the image of an object more distant from the digital camera 1 has a correspondingly larger amount of movement in the imaging field of view. It is possible to specify the image of the object nearest the digital camera 1 by utilizing such characteristics.

For specifying the object image nearest the digital camera 1, acquired multiple frames of image data and a detection signal from an acceleration sensor or gyro sensor of the sensor unit 16 is necessary. In other words, the control unit 20, based on the detection information from the acceleration sensor or the gyro sensor of the sensor unit 16, determines whether the digital camera 1 is translating or rotating in the panning direction. Then, in the case where the digital camera 1 translates, the object image in the multiple frames of image data having the maximum change of position is specified as the main object image; and in the case where the digital camera 1 moves rotationally, the object image in the multiple frames of image data having the minimum change of position is specified as the main object image.

Also, in each of the embodiments recited above, the synthesis of the image data is performed after acquiring N frames of image data; but image data may be synthesized with image data already acquired every time one frame is acquired. However, as in each of the embodiments recited above, in the case where the N frames of image data are once stored and then the synthesis of the image data is performed, an advantage is provided that it is possible to subsequently change conditions and re-synthesize the image data. Further, multiple frames of synthesized images synthesized by changing conditions for each may be displayed on the display unit 14; and it is favorable that the user may select one frame of synthesized image from the multiple synthesized images displayed on the display unit 14.

Additionally, in each of the embodiments recited above, the autofocus method is a contrast detection method; but the present invention is not limited thereto, and the method may be a phase difference detection method or an active method. Further, the present invention may of course be implemented also in cameras performing a manual focus.

Furthermore, it is possible to implement a program and thereby cause an existing digital camera or the like to function as an image capturing device according to the present invention. In other words, a program such as that executed by the control unit 20 described above may be implemented in an existing digital camera or the like; and by an execution thereof by a computer (CPU, etc.) controlling the digital camera or the like, each functional configuration, and processing described above can be realized.

The distribution method for such a program is arbitrary; and the program may be distributed by, for example, storing in a recording medium such as a CD-ROM (Compact Disk Read-Only Memory), DVD (Digital Versatile Disk), MO (Magneto Optical Disk), memory card, etc., and additionally, may be distributed, for example, via a communication network such as the internet. Then, the program thus distributed may be installed in the digital camera or the like and implemented, thereby realizing functions similar to those of the digital camera 1 described above.

Also, the image capturing device according to each of the embodiments recited above is a digital camera; but the present invention may of course be implemented in any device having a built-in miniature electronic camera, such as a mobile telephone or game device that includes a camera.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application claims priority based on Japanese Patent Application No. 2008-36995 filed on Feb. 19, 2008; and the disclosure of the above Japanese Patent Application is incorporated herein by reference in its entirety.

What is claimed is:

1. An image capturing device comprising:
an acquisition unit that acquires a plurality of image data representing mutually different images by performing a plurality of image captures of an object at different positions in a direction parallel to an optical axis of an optical system;
an extraction unit that extracts a specified object image included in each of the images represented by the plurality of image data acquired by the acquisition unit; and
a synthesis unit that produces blurred background image data representing a synthesized blurred background image by: (i) changing sizes of the images represented by the plurality of image data acquired by the acquisition unit so that the specified object images extracted by the extraction unit are superimposed on one another, and (ii) calculating luminance values of pixels of the synthesized blurred background image by calculating respective mean values of luminance values of corresponding pixels of image data representing the images whose sizes were changed.

2. The image capturing device according to claim 1, further comprising:
a detection unit that detects information relating to a change of a held position of the image capturing device by a user; and
a determination unit that determines whether or not the held position of the image capturing device has changed based on the information detected by the detection unit,
wherein the acquisition unit acquires image data representing an image by performing an image capture when the determination unit determines that the held position of the image capturing device had changed.

3. The image capturing device according to claim 1, wherein the extraction unit extracts the specified object images by performing a predetermined image processing on the images represented by the plurality of image data acquired by the acquisition unit.

4. The image capturing device according to claim 1, wherein the extraction unit extracts the specified object image included in each of the images represented by the plurality of image data acquired by the acquisition unit based on operation input information of a user.

5. A method for image capturing comprising:
   acquiring a plurality of image data representing mutually different images by performing a plurality of image captures of an object at different positions in a direction parallel to an optical axis of an optical system;
   extracting a specified object image included in each of the images represented by the plurality of acquired image data; and
   producing blurred background image data representing a synthesized blurred background image by: (i) changing sizes of the images represented by the plurality of acquired image data so that the extracted specified object images are superimposed on one another, and (ii) calculating luminance values of pixels of the synthesized blurred background image by calculating respective mean values of luminance values of corresponding pixels of image data representing the images whose sizes were changed.

6. An image capturing device comprising:
   an optical system including a zoom lens;
   a drive unit that drives the zoom lens in an optical axis direction of the optical system;
   an acquisition unit that acquires a plurality of image data representing mutually different images by performing a new image capture every time the drive unit drives the zoom lens, thereby performing a plurality of image captures of an object;
   an extraction unit that extracts a specified object image included in each of the images represented by the plurality of image data acquired by the acquisition unit; and
   a synthesis unit that produces blurred background image data representing a synthesized blurred background image by: (i) changing sizes of the images represented by the plurality of image data acquired by the acquisition unit so that the specified object images extracted by the extraction unit are superimposed on one another, and (ii) calculating luminance values of pixels of the synthesized blurred background image by calculating respective mean values of luminance values of corresponding pixels of image data representing the images whose sizes were changed.

7. A method for image capturing in an image capturing device having an optical system including a zoom lens, the method comprising:
   driving the zoom lens in an optical axis direction of the optical system;
   acquiring a plurality of image data representing mutually different images by performing a new image capture at every drive of the zoom lens, thereby performing a plurality of image captures of an object;
   extracting a specified object image included in each of the images represented by the plurality of acquired image data; and
   producing blurred background image data representing a synthesized blurred background image by: (i) changing sizes of the images represented by the plurality of acquired image data so that the extracted specified object images are superimposed on one another, and (ii) calculating luminance values of pixels of the synthesized blurred background image by calculating respective mean values of luminance values of corresponding pixels of image data representing the images whose sizes were changed.

* * * * *